US012742657B2

(12) United States Patent
Yamamoto

(10) Patent No.: US 12,742,657 B2
(45) Date of Patent: Sep. 22, 2026

(54) INFORMATION PROCESSING APPARATUS, INFORMATION PROCESSING METHOD, AND STORAGE MEDIUM

(71) Applicant: CANON KABUSHIKI KAISHA, Tokyo (JP)

(72) Inventor: Keiichi Yamamoto, Kanagawa (JP)

(73) Assignee: CANON KABUSHIKI KAISHA, Tokyo (JP)

(*) Notice: Subject to any disclaimer, the term of this patent is extended or adjusted under 35 U.S.C. 154(b) by 260 days.

(21) Appl. No.: 18/302,363

(22) Filed: Apr. 18, 2023

(65) Prior Publication Data

US 2023/0358565 A1 Nov. 9, 2023

(30) Foreign Application Priority Data

May 6, 2022 (JP) ................................ 2022-076704

(51) Int. Cl.
*G01C 21/00* (2006.01)
*G01C 21/32* (2006.01)

(52) U.S. Cl.
CPC ......... *G01C 21/3863* (2020.08); *G01C 21/32* (2013.01)

(58) Field of Classification Search
CPC ........................... G01C 21/3863; G01C 21/32
See application file for complete search history.

(56) References Cited

U.S. PATENT DOCUMENTS 2,365,448 A * 12/1944 Bicknell ................ D06F 71/40 38/40
8,731,305 B1 * 5/2014 Mantri ................ G06V 10/754 701/450
8,781,736 B2 * 7/2014 Cera ....................... G08G 1/09 340/995.13
2019/0291728 A1 * 9/2019 Shalev-Shwartz .......................... B60W 60/00274

(Continued)

FOREIGN PATENT DOCUMENTS

JP 2019-36227 A 3/2019
JP 2019-9550 A 6/2019
JP 2019-204211 A 11/2019

(Continued)

OTHER PUBLICATIONS

Japanese Search Report issued Feb. 17, 2026 in corresponding Japanese Patent Application No. 2022-076704 (English langiage translation included).

*Primary Examiner* — Adnan M Mirza
(74) *Attorney, Agent, or Firm* — VENABLE LLP

(57) ABSTRACT

An information processing apparatus capable of integrating maps with high accuracy while maintaining the degree of freedom of the movement route in map creation, acquires map data generated in accordance with movement of a movable apparatus, acquires characteristic information for identifying a partial region of a movement route of the movable apparatus, records the characteristic information in association with the map data, recognizes a common region by comparing the characteristic information recorded in (Continued)

110 association with the map data at a predetermined point in time with a plurality of pieces of the characteristic information recorded in association with the map data prior to the predetermined point in time, and integrates a plurality of pieces of the map data on the basis of the recognized common region.

6 Claims, 6 Drawing Sheets

(56) References Cited

U.S. PATENT DOCUMENTS

2021/0365701 A1* 11/2021 Eshet ................. G01C 21/3492
2023/0072508 A1 3/2023 Yamamoto

FOREIGN PATENT DOCUMENTS

JP 2021-99384 A 7/2021
KR 10-1382798 4/2014

* cited by examiner

FIG. 5

| KEY FRAME | CHARACTERISTIC INFORMATION |
|---|---|
| 201 | 200 |
| 202 | 200 |
| 203 | 200 |
| 204 | 200 |
| 205 | 200 |

INFORMATION PROCESSING APPARATUS, INFORMATION PROCESSING METHOD, AND STORAGE MEDIUM

BACKGROUND OF THE INVENTION

Field of the Invention

The present invention relates to an information processing apparatus, an information processing method, a storage medium, and the like.

Description of the Related Art

For example, a technology has been proposed in which a three-dimensional map of the surroundings of a transport vehicle (movable apparatus) such as an automated guided vehicle (AGV) is created and a position and an orientation of the movable apparatus are measured. If a three-dimensional map of a large area is created, or if a movement route of a movable apparatus is extended later, a method of integrating three-dimensional maps created by a plurality of movable apparatuses is used. However, work of searching for and integrating common regions from a large number of maps is very burdensome.

Therefore, in Japanese Patent Laid-Open No. 2019-36227, in order to easily integrate maps, a movement region of a movable apparatus is divided into grids, and vertical and horizontal ends of adjacent grids are set to partially overlap. When a map is created, map creation within one grid is ended in a region that overlaps an adjacent grid, and map creation within the next grid is started from that region.

As described above, a configuration is disclosed in which, by dividing a movement region into grid patterns, each region can share an X axis or a Y axis, and an end point and a start point of map creation are common regions, such that it is easy to integrate maps.

However, in the method disclosed in Japanese Patent Laid-Open No. 2019-36227, a range of one map creation is restricted within a grid, and a start position and an end position of map creation are also restricted to within a region where the grids overlap. Therefore, the degree of freedom of the movement route in map creation is low.

The present invention has been made in view of the above problems, and an object thereof is to provide an information processing apparatus capable of integrating maps with high accuracy while maintaining the degree of freedom of the movement route in map creation.

SUMMARY OF THE INVENTION

According to one aspect of the present invention, there is provided an information processing apparatus comprising: at least one processor or circuit configured to function as: a map data acquisition unit configured to acquire map data generated in accordance with movement of a movable apparatus; a characteristic information acquisition unit configured to acquire characteristic information for identifying a partial region of a movement route of the movable apparatus; a recording unit configured to record the characteristic information in association with the map data; a recognition unit configured to recognize a common region by comparing the characteristic information recorded in association with the map data at a predetermined point in time with a plurality of pieces of the characteristic information recorded by the recording unit in association with the map data prior to the predetermined point in time; and an integration unit configured to integrate a plurality of pieces of the map data on the basis of the common region recognized by the recognition unit.

Further features of the present invention will become apparent from the following description of embodiments with reference to the attached drawings.

BRIEF DESCRIPTION OF THE DRAWINGS

FIG. 5 is a diagram showing an example of an association file that is an association table between characteristic information and map data in First Embodiment.

DESCRIPTION OF THE EMBODIMENTS

Hereinafter, with reference to the accompanying drawings, favorable modes of the present invention will be described using Embodiments. In each diagram, the same reference signs are applied to the same members or elements, and duplicate description will be omitted or simplified.

First Embodiment

In First Embodiment, characteristic information that contributes to identification of a part of a region (hereinafter, referred to as a partial region) in which a movable apparatus is currently being moved is recorded in association with map data forming a map for calculating a position and an orientation of the movable apparatus (hereinafter, simply referred to as a map). By recognizing a region that is common (hereinafter, referred to as a common region) on the basis of the characteristic information recorded in association with each piece of map data in a plurality of maps, the common region can be easily retrieved.

The maps can be easily integrated by integrating the maps such that the pieces of map data from which the common region is recognized and which are recorded in association with the characteristic information overlap each other. Map creation is performed by simultaneously creating a map in a real space and measuring a self position and orientation in the real space by using a simultaneous localization and mapping (SLAM) technology.

Figure 1:
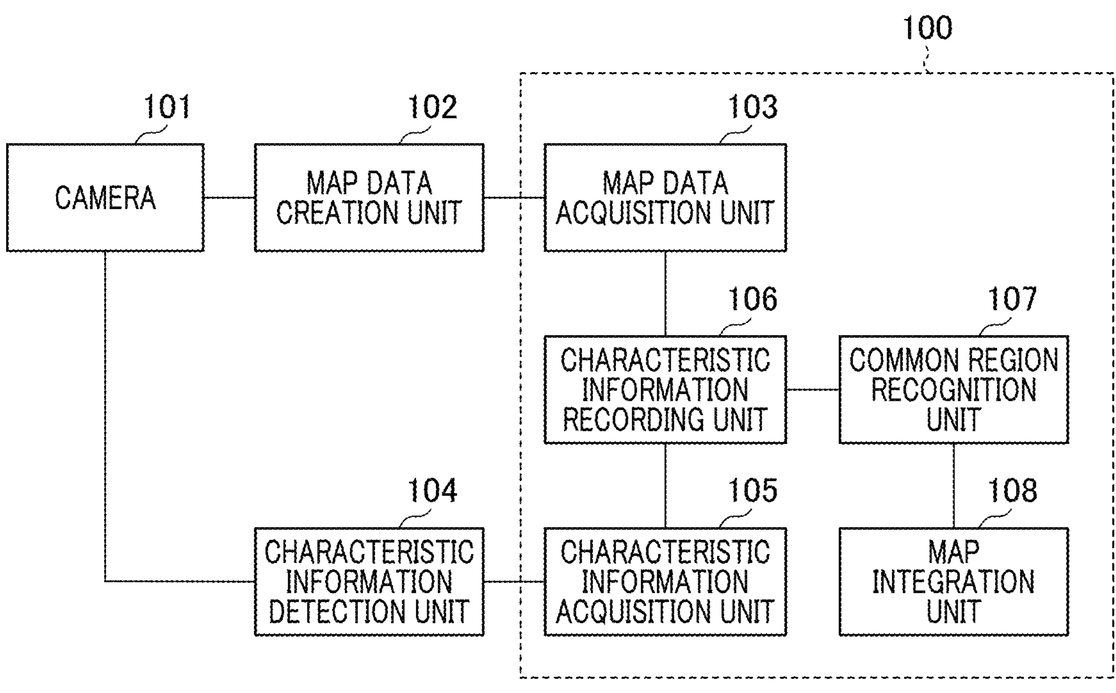
FIG. 1 is a functional block diagram showing a configuration example of an information processing apparatus in First Embodiment.

FIG. 1 is a functional block diagram showing a configuration example of an information processing apparatus in First Embodiment. Some of the functional blocks shown in FIG. 1 are realized by causing a computer included in the information processing apparatus to execute a computer program stored in a memory that is a storage medium.

However, some or all of the functional blocks may be realized by hardware. As hardware, a dedicated circuit (ASIC), a processor (for example, a reconfigurable processor or a DSP), or the like may be used. The functional blocks shown in FIG. 1 may not all be built in the same housing, and some may be configured by separate devices connected to each other via signal paths.

A camera 101 is used by a movable apparatus 110 to acquire information for map data creation and to acquire characteristic information that contributes to identification of a partial region in which the movable apparatus 110 is being moved. In First Embodiment, the camera 101 is configured with, for example, a stereo camera fixed to the movable apparatus 110, and periodically captures a stereo image with, for example, 1/30 seconds as one frame. The camera 101 may be configured with, for example, a dual pixel auto focus (DAF) type CMOS image sensor.

A map data creation unit 102 extracts a feature amount indicating a geometric structure such as an edge of an object in the image acquired by the camera 101. A distance of the feature amount in a depth direction is calculated according to triangulation using the parallax of the stereo camera, coordinates of the feature amount in a three-dimensional space are calculated together with a position of the feature amount in the image, and the feature amount and the coordinates are combined to be used as map data. A key frame is created each time the movable apparatus advances a certain distance.

The key frame is a frame from which a characteristic feature amount is extracted, a frame in which a distribution of the extracted feature amount changes significantly, or a frame at a regular interval, and is used for searching for an image at a high speed. The key frame is recorded in association with an image captured by the camera 101. A map data acquisition unit 103 acquires the map data created by the map data creation unit 102 in accordance with movement of the movable apparatus.

A characteristic information detection unit 104 detects predetermined characteristic information through image recognition on the basis of the image acquired by the camera 101. The characteristic information is used for identifying a plurality of partial regions obtained while the movable apparatus is being moved.

In First Embodiment, an ID of a predetermined indicator detected by a sensor mounted on the movable apparatus is detected. That is, the stereo camera in the camera 101 captures an image of an indicator of a partial region such as a two-dimensional barcode installed on a floor, a wall, or the like, and recognizes the image of the two-dimensional barcode or the like to detect an ID of the partial region.

A characteristic information acquisition unit 105 acquires characteristic information detected by the characteristic information detection unit 104. That is, the characteristic information for identifying a partial region of a movement route of the movable apparatus is acquired.

A characteristic information recording unit 106 records the map data acquired by the map data acquisition unit 103 in association with the characteristic information acquired by the characteristic information acquisition unit 105. Specifically, if the characteristic information is acquired, a file of map data acquired thereafter is recorded as an association file in which the characteristic information is associated.

That is, in each association file, an ID of a key frame of map data and an ID indicating a partial region that is characteristic information are recorded as metadata, for example. That is, the association file is a file that records a pair of map data and characteristic information.

A file format of the association file is, for example, a Comma Separated Value (CSV) format, an Extensible Markup Language (XML) format, or a Java Script Object Notation (JSON) format. JAVA is a registered trademark.

However, not only these formats, but also custom formats such as space delimiters, tab delimiters, and colon delimiters may also be used. For example, one association file is created for one map created on the basis of map data acquired from one movable apparatus.

A common region recognition unit 107 recognizes a common region on the basis of the characteristic information recorded in association with a plurality of pieces of map data by the characteristic information recording unit 106. Specifically, among a plurality of association files created by a plurality of movable apparatuses, a location where IDs indicating partial regions that are the characteristic information match each other is recognized as an association file of the common region.

That is, the common region is recognized by comparing the characteristic information recorded in association with the map data at a predetermined point in time with a plurality of pieces of characteristic information recorded in association with the map data prior to that point in time.

A map integration unit 108 integrates a plurality of pieces of map data on the basis of the common region recognized by the common region recognition unit 107. Specifically, the plurality of pieces of map data are integrated such that positions of feature amounts linked to a key frame ID of the location recognized as the common region among the pieces of map data match each other.

The information processing apparatus 100 of First Embodiment includes the map data acquisition unit 103, the characteristic information acquisition unit 105, the characteristic information recording unit 106, the common region recognition unit 107, the map integration unit 108, and the like. In First Embodiment, the information processing apparatus 100 is included in a management system for managing a state of the movable apparatus 110, and the camera 101, the map data creation unit 102, and the characteristic information detection unit 104 are mounted on the movable apparatus 110.

At least some of the information processing apparatus 100, the map data creation unit 102, the characteristic information detection unit 104, and the like may be mounted on the movable apparatus 110, or may be provided at a position separate from the movable apparatus 110.

Figure 2:
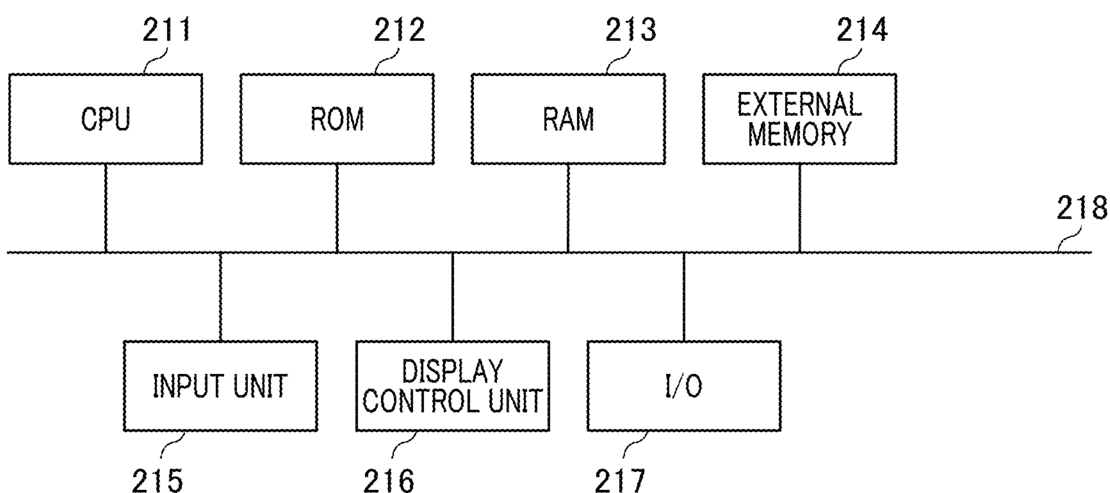
FIG. 2 is a diagram showing a hardware configuration example of an information processing apparatus 100 according to First Embodiment.

FIG. 2 is a diagram showing a hardware configuration example of the information processing apparatus 100 according to First Embodiment. A CPU 211 as a computer controls various devices connected to a system bus 218. A ROM 212 stores a BIOS program and a boot program.

A RAM 213 is used as a main memory for the CPU 211. An external memory 214 stores computer programs to be processed by the information processing apparatus 100.

An input unit 215 is a keyboard, a mouse, a robot controller, or the like, and performs processing related to input of information or the like. A display control unit 216 displays calculation results from the information processing apparatus 100 on a display device in response to an instruction from the CPU 211. The display device (not shown) controlled by the display control unit 216 may be a device of any type such as a liquid crystal display, a projector, or an LED indicator.

An I/O 217 performs information communication via a communication interface, and the communication interface may be an interface of any type such as Ethernet, USB, serial communication, or wireless communication. The I/O 217 receives output information from various sensors or other information processing apparatuses.

Figure 3:
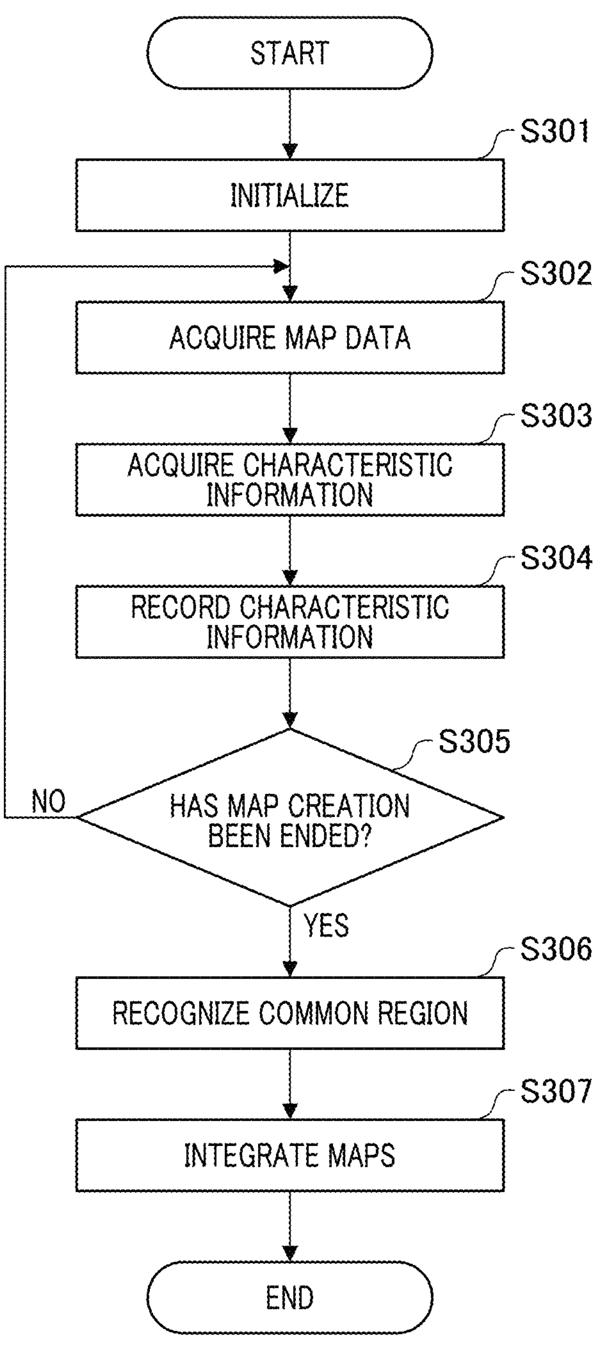
FIG. 3 is a flowchart showing an example of a processing procedure in First Embodiment.

FIG. 3 is a flowchart showing an example of a processing procedure in First Embodiment. The flow shown in FIG. 3 in First Embodiment operates in a management system of the movable apparatus, and is automatically or manually started when a map of the movable apparatus is created. The CPU 211 as a computer executes the computer program stored in the memory to perform an operation in each step in the flowchart of FIG. 3.

In step S301, the CPU 211 initializes the information processing apparatus 100. That is, the program is read from the external memory 214 and the information processing apparatus 100 is made operable. Various setting parameters are read into the RAM 23 from the external memory 214 as necessary. The various setting parameters are, for example, various threshold values and will be described later.

Step S302 is a step of acquiring map data generated by the map data generation unit 102 in accordance with movement of the movable apparatus. In First Embodiment, a stereo camera that is the camera 101 fixed to the movable apparatus 110 captures an image, and the map data creation unit 102 acquires a feature amount from the image.

Each time a feature amount is acquired, the feature amount is transmitted to the information processing apparatus 100. The map data creation unit 102 associates an ID of a key frame and the captured image with the feature amount with respect to the key frame, and transmits the association result to the information processing apparatus. In the information processing apparatus 100, the map data acquisition unit 103 acquires the feature amount and the key frame ID as map data.

In step S303, characteristic information detected by the characteristic information detection unit 104 is acquired. That is, step S303 is a step of acquiring characteristic information for identifying a partial region of a movement route of the movable apparatus. In First Embodiment, the stereo camera that is the camera 101 fixed to the movable apparatus 110 captures an image, and the characteristic information detection unit 104 detects a two-dimensional barcode or the like from the image.

If the two-dimensional barcode is detected, the characteristic information detection unit 104 extracts an ID embedded in the two-dimensional barcode and transmits the ID to the information processing apparatus 100. In the information processing apparatus 100, the characteristic information acquisition unit 105 acquires the ID of the two-dimensional barcode as characteristic information.

In step S304, when the characteristic information is acquired in step S303, the characteristic information recording unit 106 records the characteristic information in association with the map data acquired in step S302. That is, step S304 is a step of recording the characteristic information in association with the map data.

In First Embodiment, an ID of a two-dimensional barcode is recorded in association with an ID of a key frame in the association file. A predetermined number of times is determined as the number of times of recording the same characteristic information, and the same characteristic information is recorded from the time when the characteristic information is first acquired until a predetermined number of key frames are acquired as map data.

After acquiring key frames as map data for more than a predetermined number of times, the characteristic information is not recorded. A map ID indicating a corresponding map is also recorded in the association file. The map ID only needs to uniquely identify the map, and is created, for example, by combining an ID of the movable apparatus of which the map has been created, the creation start date and time, and the like.

In step S305, the CPU 211 determines whether map creation for the movable apparatus has been ended. In First Embodiment, a user gives an instruction to end map creation for the movable apparatus. If it is determined that map creation has been ended (YES in step S305), the process proceeds to step S306. If it is determined that map creation has not been ended (NO in step S305), the process returns to step S302.

In step S306, the common region recognition unit 107 retrieves a location where there is the same characteristic information of the association file recorded in step S304 this time in the characteristic information of a plurality of association files recorded in step S304 in the past.

If there is a location where the characteristic information is the same, the location is recognized as a common region. That is, step S306 is a step of recognizing a common region by comparing the characteristic information recorded in association with the map data at a predetermined point in time and a plurality of pieces of characteristic information recorded in association with the map data prior to that predetermined point in time.

That is, a plurality of association files recorded in the past are searched, and a location where an ID of a two-dimensional barcode that is characteristic information matches the two-dimensional barcode that is characteristic information recorded in the association file recorded in step S304 this time is recognized as a common region.

In this case, map IDs recorded in the respective association files in which the common region is recognized to be present and a key frame ID of the location where the two-dimensional barcodes in the respective association files match each other are stored in a file for the common region in association with each other.

A new common region ID uniquely indicating a common region may be created, and such information may be associated with the common region ID. The common region ID may be, for example, a serial number and incremented every time a common region is recognized.

Step S307 is a step in which the map integration unit 108 integrates maps on the basis of the common region recognized in step S305. In First Embodiment, the map ID and key frame ID from which the common region is recorded are obtained by referring to the file for the common region created in step S305. A target map is specified by the map ID, and a key frame within the map is specified by the key frame ID The maps are shifted such that a positional difference between the plurality of feature amounts linked to the plurality of key frames specified as described above is minimized, and the maps are integrated such that the positional difference is minimized. That is, the plurality of maps is integrated such that a deviation between overlapping portions of the plurality of pieces of map data from which the common region is recognized and which are recorded in association with the characteristic information is reduced. After the process in step S307, the flow in FIG. 3 is ended.

Figure 4:
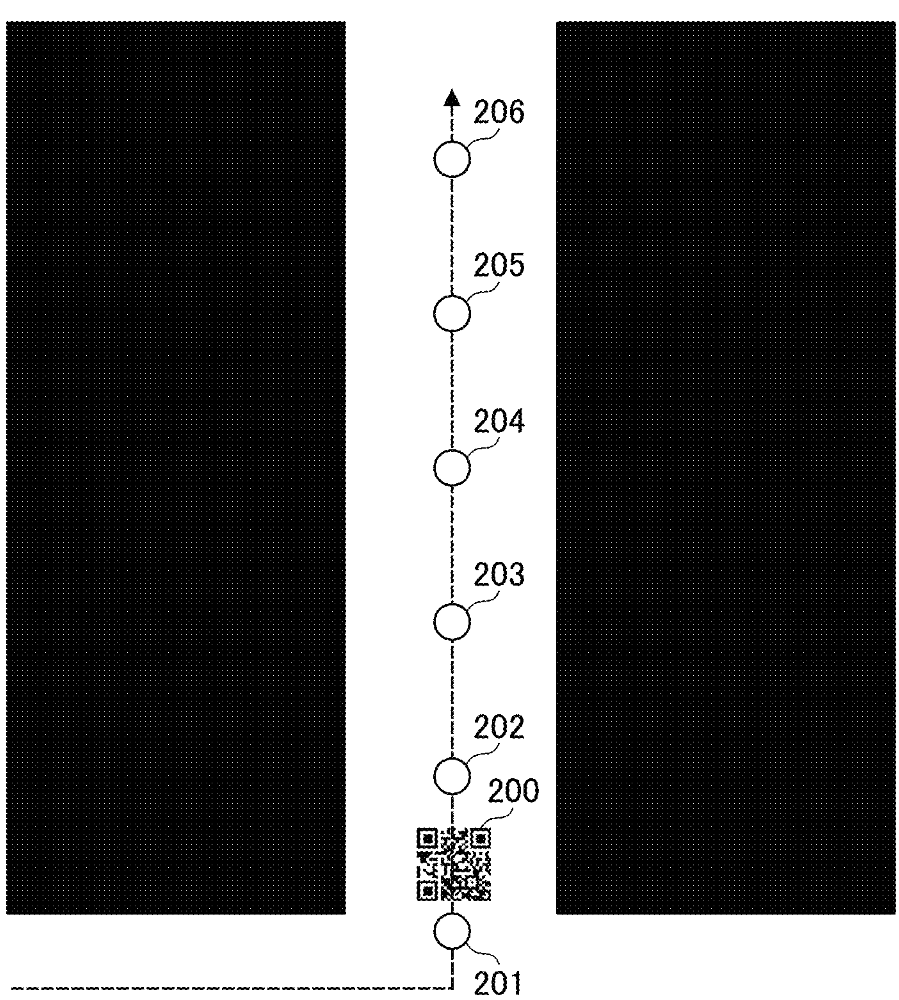
FIG. 4 is a diagram for describing an operation when a movable apparatus is moved in First Embodiment.

FIG. 4 is a diagram for describing an operation when the movable apparatus is moved in First Embodiment, and shows a state of a space in which the movable apparatus is moved as viewed from above. FIG. 5 is a diagram showing an example of an association file that is an association table between characteristic information and map data in First Embodiment.

Black parts in FIG. 4 are walls or the like. A dotted line indicates a movement route of the movable apparatus, and the movable apparatus is assumed to be moved in the direction of the arrow. In FIG. 4, the reference numeral 200 denotes a two-dimensional barcode that is displayed on a floor.

In FIG. 4, the reference numerals 201 to 206 respectively denote positions of the movable apparatus 110 during movement. The movable apparatus may be moved by a person directly pushing the movable apparatus, or may be moved by a motor or the like through remote control.

In First Embodiment, the movable apparatus creates key frames at the positions 201 to 206 and attempts to acquire characteristic information at the same time.

At the position 201, the movable apparatus attempts to acquire characteristic information at the same time as creating a key frame. That is, as described above, a feature amount and three-dimensional coordinates thereof are acquired as key frames from the image captured by the stereo camera that is the camera 101, and information embedded in the two-dimensional barcode 200 is obtained as characteristic information.

In First Embodiment, the numbers shown in FIG. 4 are set as a two-dimensional barcode ID and key frame IDs, respectively. At the position 201, the characteristic information is acquired, and thus the ID 201 of the key frame and the ID 200 of the two-dimensional barcode are associated and recorded in the association file as shown in FIG. 5.

At the position 202, a two-dimensional barcode is not detected and characteristic information is not acquired, but the characteristic information obtained at the position 201 is inherited and the same ID 200 is recorded. That is, 200 that is the ID of the two-dimensional barcode is recorded in association with the key frame ID 202 in FIG. 5.

Similar processing is performed at the position 203 and subsequent positions, but in First Embodiment, the number of times of recording the same characteristic information is determined in advance, for example, 5 times, and after the characteristic information is first acquired, for example, the same characteristic information is recorded for five key frames.

That is, in FIG. 4, 200 that is the ID of the two-dimensional barcode 200 is associated and recorded as the characteristic information from the position 201 to the position 205 for five times from the characteristic information acquisition. At the point in time of the key frame ID 206 that is the sixth time from the characteristic information acquisition, 200 that is the ID of the two-dimensional barcode is not associated and recorded. However, if a two-dimensional barcode different from 200 is detected, after that, characteristic information is associated and recorded.

As described above, in First Embodiment, characteristic information that contributes to identification of a partial region in which the movable apparatus 110 is currently being moved is recorded in association with map data forming a map for calculating a position and an orientation of the movable apparatus.

By recognizing a common region on the basis of the characteristic information recorded in association with each piece of map data in a plurality of maps, the common region can be easily retrieved. The maps can be easily integrated by integrating the maps such that pieces of map data from which a common region is recognized and which are recorded in association with characteristic information overlap each other. Since it is only necessary to pass through a common region at some point on a route at the time of creating the map, the degree of freedom of a movement route at the time of creating the map is high.

Modification Examples

In First Embodiment, an ID of a two-dimensional barcode is used as characteristic information, but a feature amount of an image such as a landscape or a poster that can specify a partial region imaged by a camera may also be used.

That is, a feature amount extracted from an image acquired by a camera as an imaging device mounted on a movable apparatus may be used. If there is a three-dimensional building, landmark, or the like of which a partial region can be specified, a three-dimensional feature amount extracted from a distance image acquired by the camera 101 may be used as characteristic information. The number of feature amounts may be used as characteristic information.

In that case, the camera 101 is not limited to a stereo camera, and may be, for example, a monocular camera, a camera with three or more eyes, or a distance measuring device such as a TOF sensor or a LiDAR. That is, a feature amount extracted from a distance image acquired by a camera as an imaging device mounted on a movable apparatus or by a distance measuring device may be used.

For recognition of a common region, as shown in FIG. 5, a plurality of past association files in which information such as characteristic data and feature amounts is recorded are searched, and instead of a two-dimensional barcode ID, a location where a difference in the number of feature amounts or a difference in a position of the feature amount is less than a predetermined threshold value may be recognized as a common region.

Instead of a two-dimensional barcode ID, an ID of an indicator such as a magnetic tape on a floor detected by a magnetic sensor or an ID of an indicator such as a beacon installed on a floor, a wall, a ceiling, or the like detected by a proximity wireless sensor may be used as characteristic information.

As characteristic information, an ID of an indicator such as a fixed camera, a radio frequency identifier (RFID) sensor, an infrared sensor, or a distance measuring device that is present around a movement route of the movable apparatus may be detected when the movable apparatus passes near the indicator.

In First Embodiment, an ID that is characteristic information is a numerical value, but the characteristic information may be a character or a symbol, or the character and the symbol may be mixed. A sensor for detecting an ID that is characteristic information may be a magnetic sensor or a proximity wireless sensor fixed to the movable apparatus.

Conversely, a sensor device such as a fixed camera, an RFID gate, an infrared sensor, or a distance measuring device may be disposed around a movement route of the movable apparatus, and when the movable apparatus passes near the sensor device, an ID related to a position of the sensor device may be acquired from the sensor device through communication. That is, an ID acquired from an external device that has detected the passage of the movable apparatus may be used.

If an ID of the two-dimensional barcode is used as characteristic information, the ID may be acquired as characteristic information if a distance from the movable apparatus to the two-dimensional barcode reaches a predetermined distance. If a two-dimensional barcode is detected obliquely, an ID may not be acquired as characteristic information, but if the two-dimensional barcode is detected from the front, the ID may be acquired as characteristic information.

Instead of a two-dimensional barcode ID, for example, information regarding a movement distance or a movement route during straight movement may be used as characteristic information. In this case, such information may be acquired from an inertial measurement device provided on the movable apparatus, an encoder for measuring an amount of rotation of wheels of the movable apparatus, or the like. In other words, history information regarding a movement route of the movable apparatus may be used as characteristic information.

As characteristic information, instead of a two-dimensional barcode ID, for example, characteristics of intersections may be recognized, and a distance between the intersections, the number of intersections passed through, or the like may be used as history information regarding a movement route of the movable apparatus, and the history information may be used as characteristic information.

As described above, a location of a partial region may be specified on the basis of a difference in a distance when the movable apparatus passes through the partial region through which the movable apparatus has been moved, the number of passages of a feature object, and the like. In that case, for recognition of a common region, a location where a difference in the distance or the number of passages is less than a predetermined threshold value may be recognized as the common region.

As characteristic information, instead of a two-dimensional barcode ID, a change in an advancing direction of a movable apparatus may be detected, and a movement route in which the advancing direction always changes to, for example, the right, the left, and the right when the movable apparatus passes through a partial region may be used.

In that case, the various sensors described above may be used as appropriate. For example, a movable apparatus may turn right, left, and right, and characteristic information may be recorded in association with a plurality of pieces of map data of right, left, and right locations through which the movable apparatus has passed. For recognition of a common region, a location where movement routes match may be used as the common region.

If a map is created by using a stereo camera as in First Embodiment, the appearance of a detected feature amount will change if a passage direction is reversed. Thus, even if the same partial region is passed through, if a passage direction is different, a positional relationship between feature amounts will not match, and maps cannot be integrated. Therefore, in addition to characteristic information, by recognizing a location where both passage directions match as a common region, maps having the same positional relationship between feature amounts may be integrated.

As described above, the passage direction (advancing direction) of the movable apparatus may be included in addition to the characteristic information. For example, in the case of a two-dimensional barcode placed on a floor, the top and bottom of the two-dimensional barcode in an image is determined, if the upper side of the two-dimensional barcode is on the upper side of the image, a forward direction is set, and if the upper side of the two-dimensional bar code is on the lower side of the image, a reverse direction is set.

Numerical values, character strings, or the like indicating such forward and reverse directions may be added to the characteristic information. Alternatively, a plurality of two-dimensional barcodes, magnetic tapes, beacons, RFID gates, infrared sensors, or the like may be arranged, a passage direction may be specified according to the order in which a movable apparatus passes, and a numerical value or character string indicating the passage direction may be added to the characteristic information.

If a bird's-eye view camera is installed around a movement route of a movable apparatus and a notification of a position through which the movable apparatus has passed is provided, a movement direction of the movable apparatus may be calculated from a time-series image group captured by the bird's-eye camera, and a numerical value or a character string indicating the movement direction may be added to the characteristic information.

If a distance measuring device is provided around a movement route of a movable apparatus and a notification of a position where the movable apparatus has passed is provided, information indicating whether a distance to the movable apparatus has decreased or increased may be used as information regarding an advancing direction of the movable apparatus, and the information regarding the advancing direction may be included in the characteristic information.

In First Embodiment, map data and characteristic information are separately transmitted from the movable apparatus 110 and acquired separately by the information processing apparatus 100, but may be transmitted simultaneously and acquired simultaneously.

In First Embodiment, the characteristic information is recorded in association with a key frame ID of a key frame, but may be recorded in association with a feature amount itself. The characteristic information may be associated with information corresponding to a partial region in a map without being directly associated with map data. For example, the characteristic information may be associated with a partial region (a rectangular parallelepiped region including a part of a route, or the like) in a coordinate space of a map or coordinates.

In First Embodiment, a correspondence relationship between a key frame ID and a two-dimensional barcode ID is recorded in the association file, but may be recorded as a variable in a database or a memory instead of a file. The characteristic information may be directly embedded in map data such as a feature amount and recorded.

In First Embodiment, a period (number of times) in which the same characteristic information is recorded is a fixed period (number of times), but the same characteristic information may be recorded continuously until another characteristic information is acquired. The recording of characteristic information may be stopped when characteristic information indicating an exit of a predetermined partial region is acquired.

If a bird's-eye view camera is provided around a movement route of the movable apparatus and a notification of a position through which the movable apparatus has passed is provided, recording of characteristic information may be started when the movable apparatus enters an angle of view to be imaged, and recording of characteristic information may be stopped when the movable apparatus leaves the angle of view.

A virtual line may be set within the angle of view of the bird's-eye view camera, and when the movable apparatus passes through the virtual line set as an entrance, recording of characteristic information may be started, and when the movable apparatus passes through the virtual line set as an exit, recording of characteristic information may be stopped.

The recording of the characteristic information may be stopped when a behavior (acceleration) of the movable apparatus changes, such as turning or stopping.

In First Embodiment, a common region is recognized after map creation is completed, but a common region may be recognized through comparison with characteristic information in an association file recorded in the past each time a movable apparatus acquires map data and characteristic information. Alternatively, a common region may be recognized in the same procedure as in step S306 in FIG. 3 when a user gives an instruction for map integration.

In First Embodiment, a map and a key frame in the map are specified from a map ID and a key frame ID from which a common region is recorded, and maps are integrated such that a positional difference between feature amounts associated with the key frame is minimized.

However, the present invention is not limited to this, and maps may be integrated such that a difference between positions of feature amounts is minimized, including several frames before and after recognition of a common region. As described above, even if an acquisition timing of the characteristic information is shifted, the shift can be absorbed and maps can be integrated.

The various modification examples and the like described above may be combined as appropriate. That is, the characteristic information includes at least one of an ID of an indicator detected by a sensor mounted on a movable apparatus, a feature amount extracted from an image or a distance image acquired by an imaging device, history information regarding a movement route of the movable apparatus, an ID acquired from an external device that has detected passage of the movable apparatus, and the like.

The common region includes at least one of a region of which IDs match in a plurality of pieces of map data, a region where a difference in the number of feature amounts is less than a threshold value, a region where a difference between positions of feature amounts is less than a threshold value, a region in which pieces of information regarding change positions of movement routes match, and the like.

If the same characteristic information is recorded in more frames than a predetermined number of times, maps may be integrated such that a difference between positions of corresponding feature amounts is minimized by using only a predetermined number of initial frames in which a common region is recognized. As described above, by ignoring frames far from a position where the characteristic information is acquired, maps can be efficiently integrated even if the same characteristic information is recorded outside a common region.

Second Embodiment

In Second Embodiment, by presenting a location recognized as a common region to a user, the user can check whether a recognition result of the common region is correct.

That is, in Second Embodiment, if a common region is recognized by the common region recognition unit 107, the display control unit 216 generates a display image indicating a location recognized as a common region, and the display control unit 216 transmits the display image to a display unit (not shown) such that the image is displayed on a display screen.

Figure 6:
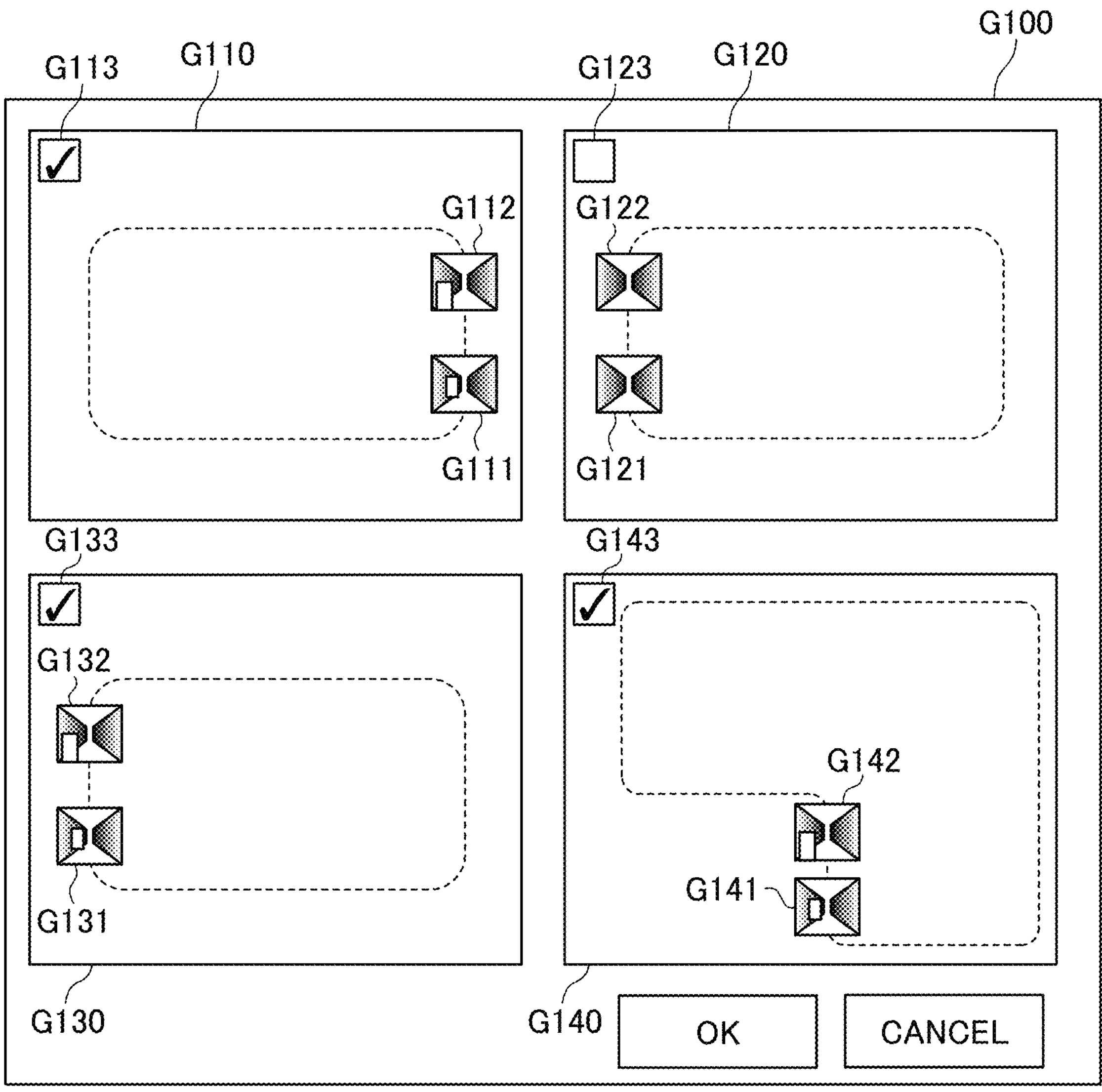
FIG. 6 is a diagram showing an example of an image of which display is controlled by a display control unit 216 in Second Embodiment.

FIG. 6 is a diagram showing an example of an image generated by the display control unit 216 in Second Embodiment. The reference sign G100 denotes display details of the image generated by the display control unit 216, and may be displayed on the entire screen or on a part of the screen.

The reference signs G110, G120, G130, and G140 denote maps created and displayed on the basis of map data acquired from different movable apparatuses. A dotted line indicates a movement route of each movable apparatus.

The reference signs G111 and G112 denote captured images (thumbnail images) of locations recognized as common regions. Specifically, as described in step S306 in FIG. 3, for example, a common region in an association file recorded on the basis of map data and characteristic information of a movable apparatus that has created the map G110 is recognized.

Key frame information is acquired from the map data on the basis of a key frame ID recorded in the association file of the recognized location, and the captured image recorded in association with the key frame is displayed.

The reference signs G121, G122, G131, G132, G141, and G142 denote displayed captured images (thumbnail images) of locations recognized as common regions in association files of the respective movable apparatuses. A position at which the captured image of the location recognized as the common region is displayed is a point of a key frame associated with the captured image on the movement route of the movable apparatus.

With this configuration, a user can determine a location on the movement route recognized as the common region, and compare images captured in the common region to determine whether regions are really the same.

The reference signs G113, G123, G133, and G143 denote checkboxes for designating whether the locations recognized as common regions are correct and whether the maps can be integrated. In the example in FIG. 6, the captured images G121 and G122 of the common regions in the map G120 are images that are considered to be points different from the other captured images. Therefore, a user may select to exclude the captured images from integration targets of maps by not checking the checkbox G123.

If the user presses an OK button after the user has finished selecting the checkbox, the maps with the checkboxes checked will be integrated.

The flowchart in Second Embodiment differs only in that the image generation process is added to the flowchart in FIG. 3 described in First Embodiment. That is, if the common region is recognized in step S306, an image in which the movement route of the movable apparatus and the image captured in the common region are drawn as shown in the example in FIG. 6 is generated by the display control unit 216 and transmitted to a display device (not shown).

As described above, by presenting a location recognized as common region to a user, the user can easily check whether a recognition result of the common region is correct.

In Second Embodiment, thumbnail images of captured images in key frames are displayed on the movement route to indicate common regions, but a portion recognized as a common region on the movement route may be highlighted.

As a method of highlighting, the movement route may be surrounded with a frame, a color of the portion may be changed, or the portion may be thickened. Instead of the movement route, a position of a feature amount that is map data acquired from the movable apparatus may be displayed as a point group, and a portion recognized as a common region in the point group may be highlighted. As a method of highlighting, the feature amount may be surrounded with a frame, a color of the feature amount may be changed, or the feature amount may be enlarged.

In Second Embodiment, an example of selecting a map to be combined by using a checkbox has been described, but any method may be used to display a selected map, as long as it is easily ascertained whether or not the map is selected, such as showing that the map is selected by changing a color of the frame of the map G110 in FIG. 6.

In Second Embodiment, maps created on the basis of map data acquired from plurality of movable apparatuses are displayed to be arranged such that the maps can be compared. However, only one map may be displayed, and a user may determine whether or not a location is a place set as a common region from a landscape of a captured image of the common region.

While the present invention has been described with reference to exemplary embodiments, it is to be understood that the invention is not limited to the disclosed exemplary embodiments. The scope of the following claims is to be accorded the broadest interpretation to encompass all such modifications and equivalent structures and functions.

In addition, as a part or the whole of the control according to the embodiments, a computer program realizing the function of the embodiments described above may be supplied to the information processing apparatus through a network or various storage media. Then, a computer (or a CPU, an MPU, or the like) of the information processing apparatus may be configured to read and execute the program. In such a case, the program and the storage medium storing the program configure the present invention.

This application claims the benefit of Japanese Patent Application No. 2022-076704, filed on May 6, 2022, which is hereby incorporated by reference herein in its entirety.

What is claimed is:

1. An information processing apparatus comprising:

at least one processor or circuit configured to function as:

a map element acquisition unit configured to acquire map elements generated in accordance with movement of a movable apparatus;

a characteristic information acquisition unit configured to acquire predetermined image information that is able to identify a partial region of a movement route of the movable apparatus during the movement of the movable apparatus;

a recording unit configured to record the predetermined image information in association with the map elements;

a recognition unit configured to recognize map elements of which a plurality of pieces of predetermined image information consecutively match each other as a common region that corresponds to a common region of the movement routes by comparing a plurality of pieces of predetermined image information recorded in association with the map elements in a first map elements group at predetermined points in time with a plurality of pieces of the predetermined image information recorded by the recording unit in association with the map elements in a second map elements group prior to the predetermined points in time; and an integration unit configured to stitch the first map elements group with the second map elements group on the basis of the common region recognized by the recognition unit, wherein the predetermined image information includes at least one of an ID of a predetermined indicator that is installed at a predetermined position and is detected by a sensor mounted on the movable apparatus during the movement, a feature amount of an object installed at a predetermined position acquired by an imaging device mounted on the movable apparatus, history information regarding a movement route of the movable apparatus, and an ID acquired from an external device that has detected passage of the movable apparatus, and wherein the common region includes at least one of a region of which IDs match in the plurality of pieces of map elements, a region where a difference in the number of feature amounts is less than a predetermined threshold value, a region where a difference between positions of feature amounts is less than a predetermined threshold value, a region where a difference between movement routes is less than a predetermined threshold value, and a region in which pieces of information regarding change positions of movement routes match.

2. The information processing apparatus according to claim 1, wherein the predetermined image information includes information regarding an advancing direction of the movable apparatus.

3. The information processing apparatus according to claim 1, wherein the integration unit integrates the map elements such that a deviation between overlapping portions of the plurality of pieces of map elements from which the common region is recognized by the recognition unit and which are recorded in association with the predetermined image information recognized as the common region is reduced.

4. The information processing apparatus according to claim 1, wherein the at least one processor or circuit is further configured to function as:

an image generation unit configured to generate a display image indicating a location recognized as the common region by the recognition unit.

5. An information processing method comprising:

acquiring map elements generated in accordance with movement of a movable apparatus;

acquiring predetermined image information that is able to identify a partial region of a movement route of the movable apparatus during the movement of the movable apparatus;

recording the predetermined image information in association with the map elements;

recognizing map elements of which a plurality of pieces of predetermined image information consecutively match each other as a common region that corresponds to a common region of the movement routes by comparing a plurality of pieces of predetermined image information recorded in association with the map elements in a first map elements group at predetermined points in time with a plurality of pieces of the predetermined image information recorded in the recording in association with the map elements in a second map elements group prior to the predetermined points in time; and stitching the first map elements group with the second map elements group on the basis of the common region recognized in the recognizing, wherein the predetermined image information includes at least one of an ID of a predetermined indicator that is installed at a predetermined position and is detected by a sensor mounted on the movable apparatus during the movement, a feature amount of an object installed at a predetermined position acquired by an imaging device mounted on the movable apparatus, history information regarding a movement route of the movable apparatus, and an ID acquired from an external device that has detected passage of the movable apparatus, and wherein the common region includes at least one of a region of which IDs match in the plurality of pieces of map elements, a region where a difference in the number of feature amounts is less than a predetermined threshold value, a region where a difference between positions of feature amounts is less than a predetermined threshold value, a region where a difference between movement routes is less than a predetermined threshold value, and a region in which pieces of information regarding change positions of movement routes match.

6. A non-transitory computer-readable storage medium configured to store a computer program comprising instructions for executing following processes:

acquiring map elements generated in accordance with movement of a movable apparatus;

acquiring predetermined image information that is able to identify a partial region of a movement route of the movable apparatus during the movement of the movable apparatus;

recording the predetermined image information in association with the map elements;

recognizing map elements of which a plurality of pieces of predetermined image information consecutively match each other as a common region that corresponds to a common region of the movement routes by comparing a plurality of pieces of predetermined image information recorded in association with the map elements in a first map elements group at predetermined points in time with a plurality of pieces of the predetermined image information recorded in the recording in association with the map elements in a second map elements group prior to the predetermined points in time; and stitching the first map elements group with the second map elements group on the basis of the common region recognized in the recognizing, wherein the predetermined image information includes at least one of an ID of a predetermined indicator that is installed at a predetermined position and is detected by a sensor mounted on the movable apparatus during the movement, a feature amount of an object installed at a predetermined position acquired by an imaging device mounted on the movable apparatus, history information regarding a movement route of the movable apparatus, and an ID acquired from an external device that has detected passage of the movable apparatus, and wherein the common region includes at least one of a region of which IDs match in the plurality of pieces of map elements, a region where a difference in the number of feature amounts is less than a predetermined threshold value, a region where a difference between positions of feature amounts is less than a predetermined threshold value, a region where a difference between movement routes is less than a predetermined threshold value, and a region in which pieces of information regarding change positions of movement routes match.

* * * * *